US005733620A

United States Patent [19]
Baader et al.

[11] Patent Number: 5,733,620
[45] Date of Patent: Mar. 31, 1998

[54] ROOF FOR VEHICLES, PARTICULARLY FOR CONVERTIBLES

[75] Inventors: Hans-Joachim Baader; Hans Nockemann, both of Wuppertal; Bruno Schwarz, Oberlaudenbach, all of Germany

[73] Assignee: Happich Fahrzeug-und Industrieteile GmbH, Wuppertal, Germany

[21] Appl. No.: 595,363

[22] Filed: Feb. 1, 1996

Related U.S. Application Data

[63] Continuation-in-part of Ser. No. 548,054, Oct. 25, 1995.

[30] Foreign Application Priority Data

Feb. 3, 1995 [DE] Germany ............... 195 03 428.7

[51] Int. Cl.⁶ ............................................. B32B 7/08
[52] U.S. Cl. ............... 428/40; 428/911; 442/308; 442/309; 442/319
[58] Field of Search .................... 428/911, 229, 428/225, 233, 253, 290, 344, 297, 298, 300, 40; 442/308, 309, 319

[56] References Cited

U.S. PATENT DOCUMENTS

| | | | |
|---|---|---|---|
| 4,851,283 | 7/1989 | Holtrop et al. | 428/284 |
| 4,930,832 | 6/1990 | Shelton | 428/911 |
| 5,385,774 | 1/1995 | Cramer et al. | |
| 5,545,470 | 8/1996 | Schuster et al. | 428/229 |

FOREIGN PATENT DOCUMENTS

| | | |
|---|---|---|
| 0052272 | 8/1986 | Australia. |
| 0190064 | 6/1986 | European Pat. Off.. |
| 0355879 | 2/1990 | European Pat. Off.. |
| 0512382 | 11/1992 | European Pat. Off.. |
| 2592334 | 3/1987 | France. |
| 3702639 | 7/1987 | Germany. |
| 9004625 | 4/1990 | Germany. |
| 2204235 | 9/1988 | United Kingdom. |

*Primary Examiner*—Marion E. McCamish
*Assistant Examiner*—Elizabeth M. Cole
*Attorney, Agent, or Firm*—Brinks Hofer Gilson & Lione

[57] ABSTRACT

A roof for vehicles, particularly convertibles: A roof material including an upper fabric layer, a lower fabric layer, a rubberizing layer arranged between the upper and lower fabric. Possibly a ceiling inner lining is arranged below the roof material. A protective layer is arranged on the lower fabric layer and/or on the top side of the ceiling inner lining. The protective layer consists of a cut resistant material of cut-proof fibers such as aromatic polyamide fibers, polyethylene fibers spun by the gel-spinning process, or glass fibers. A wire is in at least one system of the threads of the cut resistant material. A textile nonwoven layer is applied, by needling, on at least one side or both sides of the protective layer.

28 Claims, 1 Drawing Sheet

ROOF FOR VEHICLES, PARTICULARLY FOR CONVERTIBLES

CROSS REFERENCE TO RELATED APPLICATION

This is a continuation-in-part of U.S. application Ser. No. 08/548,054, filed Oct. 25, 1995, allowed.

BACKGROUND OF THE INVENTION

The present invention relates to a theft-resistant and/or a vandalism-resistant roof for vehicles, particularly convertible automobiles.

U.S. Pat. No. 5,385,774 describes a roof material for vehicles, particularly convertibles, which is resistant to theft and/or vandalism. It consists of an upper or outer fabric layer, a bottom or inward fabric layer, and a rubberizing layer arranged between the fabric layers. The upper fabric layer is formed of warp and filling threads of polyacrylonitrile. At least the warp threads of the upper fabric consist of endless filaments (multifilaments). The upper fabric is provided with a coating on at least its upper outer side. The rubberizing between the upper and bottom fabric layers is itself developed in two layers, and an intermediate layer of a material, which is of high strength as compared with the rubberizing layers, is embedded between the rubberizing layers. The intermediate layer of high strength material can consist of fibers or threads of aramid, carbon, glass, steel or highly stretched polyethylene. The intermediate layer may consist of a lattice fabric having warp and filling threads which extend at an angle of between 30° and 60°, and preferably 45°, to the longitudinal axis of the fabric. The intermediate layer of high strength material is not sufficient in all cases to assure protection against theft or vandalism.

In order to prevent vandalism, or at least make it more difficult, different solutions have already been proposed for car seats.

Federal Republic of Germany A 3 702 639 suggests arranging a fine-mesh metal fabric between the upper fabric layer of seat upholstery and the foam material which forms the body of the seat. A similar suggestion is proposed in British Publication A 2 204 235.

Knitted fabrics of wire or metal fibers are described in Federal Republic of Germany U 90 04 625 and in EP-A 190 064.

In principle, use of such fabrics also protects against theft and/or vandalism in the case of roof materials.

Flat structures of metal wires or metal fibers have considerable disadvantages as a protective layer in roof materials. These disadvantages are evident both upon working with the materials during production and also in particular upon their use. As already described in U.S. Pat. No. 5,385,774, these protective layers are customarily arranged below the upper fabric layer because only at this location can they provide their protective action without being noticeable to the user or to a vandal. Such flat structures of metal wires and metal fibers are relatively difficult to work due to their poor flexibility because additional cutting or slitting or notching processes are necessary in order, in particular, to bridge over non-flat surfaces which is necessary to a large extent upon the manufacture of convertible roofs. These processes increase the cost of production.

The disadvantages of anti-theft and/or anti-vandalism layers of metal wires or metal fibers become evident particularly upon their use. The protective layers make opening and closing the convertible roof difficult because these metal wires or fibers produce a harder and stiffer roof material.

Further, individual torn wires constantly are worked out upon use and that presents a particular problem. These wires then pass inward or outward through the upholstery and protrude from the roof material, frequently without being sufficiently visible or noticeable. Users of the vehicles or those contacting the convertible roof cover may be injured upon the opening and closing of the convertible roof.

In order to avoid these disadvantages, anti-vandalism layers of cut-resistant textile fibers have already been described for car seats. Austrian Patent Publication A-86-52 272 discloses an anti-vandalism layer formed of a fabric or a needled felt of aromatic polyamide fibers, that is aramid fibers, and this layer is bonded to the outer fabric layer of the car seat. A needled felt of aramid fibers used as an anti-vandalism layer is also mentioned in EP-A 355 879.

Neither woven fabrics nor needled felts of aromatic polyamide fibers, however, provide the required resistance to attempts to cut or pierce them. Although these solutions do not have the disadvantages of anti-theft or anti-vandalism layers of metal, they also do not satisfy the requirements as to resistance to cutting and piercing that should be provided by anti-theft or anti-vandalism layers.

Two anti-vandalism layers, one of a metal lattice and a second of aramid fibers, are described in French A 2 592 334. They reduce the above mentioned disadvantages somewhat. But, the danger of injury from protruding wires and the disadvantage of more difficult working of anti-vandalism layers of metal are still present. In addition, this solution also has higher production costs than those incurred upon the working of a single anti-vandalism layer.

A protective layer which may be comprised of different flat surface structures and of very different materials, such as glass fibers, polyester fibers, ceramic fibers, aromatic polyamide fibers or carbon fibers, is disclosed in EP-A 512 382. These fiber materials may be developed in the form of grids, nets, woven fabrics or knitted fabrics. That EP patent application, however, does not indicate the nature of such a protective layer required to assure sufficient resistance to theft and vandalism.

Finally, a cut resistant anti-theft, anti-vandalism layer for a vehicle seat is disclosed in above noted U.S. application Ser. No. 08/548,054, and the description of the material of such a layer is incorporated herein by reference.

SUMMARY OF THE INVENTION

The object of the present invention is to provide a roof for vehicles, particularly convertible automobiles, which has satisfactory workability and has high resistance to puncture, stabbing and cutting, and poses little danger of inflicting injury from contact with the roof, and which and thus permits inexpensive manufacture and working of the material.

Another object is to provide a convertible roof which is difficult to burn or which will not burn in order to satisfy the requirement of flame-retardant properties of anti-theft and/or anti-vandalism roofs.

The invention provides a roof having a roof material comprising an upper or outer fabric layer, a bottom or inward fabric layer and a rubberizing layer arranged between the upper and lower fabric layers. Possibly a ceiling inner lining is arranged below the roof material. A protective layer is arranged below the bottom fabric layer and/or on the top side of the ceiling inner lining.

The protective layer includes a cut-resistant layer of cut-resistant fibers, such as aromatic polyamide fibers, polyethylene fibers spun by the gel-spinning process or glass fibers. A wire or, more typically, several wires are disposed in at least one of the thread systems of the cut resistant layer. A textile nonwoven layer is applied to at least one side or surface of the cut resistant layer, e.g., at least the side toward the ceiling liner.

Other objects and features of the present invention become apparent from the following description of a preferred embodiment in the invention in conjunction with the accompanying drawings.

DESCRIPTION OF PREFERRED EMBODIMENTS

Figure 1:
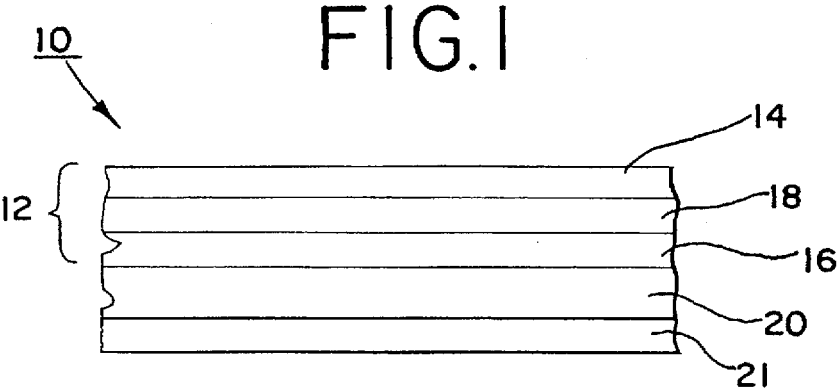
FIG. 1 is a broken-away, prospective, schematic view of one embodiment of a vehicle roof covering comprised of several layers, including a protective layer.

The roof covering for a convertible automobile is a thin and flexible covering. Various layers for inclusion in that covering are shown somewhat thick in FIG. 1, as compared with their actual anticipated thickness in the actual roof.

The roof 10 according to the invention includes the roof material 12 which is comprised of several layers. These include an upper outer fabric layer 14 which faces the exterior of the vehicle and a bottom fabric layer 16 which faces into the vehicle, but is covered, as described below. A flexible layer of a rubberized material 18 is disposed between the outer and inner or upper and bottom layers 14 and 16. The rubberized layer gives some strength and stiffness to the roof and is adapted to be repeatedly flexed as the roof repeatedly opened and closed in use.

A protective layer 20 adapted according to the present invention is disposed below or on the inside of the bottom fabric layer 20. The invention concerns the selection of a particular protective layer for use with the roof material 12. Finally, below the protective layer, on the inside of the roof, there is a ceiling liner 21, which is optionally provided because the inside surface of the protective layer may serve as the ceiling liner, rather than providing the extra ceiling liner which is attached below the protective layer.

Disclosure of a cut resistant material for use in the seat of a vehicle appears in the previously mentioned U.S. application Ser. No. 08/548,054, incorporated herein. A particular version of a protective layer 20 useful for a roof of a convertible is here described.

In the protective layer 20 there is a cut resistant layer 22 either wholly consisting of or preferably comprising and therefore including some cut resistant fibers. Appropriate materials for those fibers have been mentioned above and are also discussed in more detail below.

Figure 2:
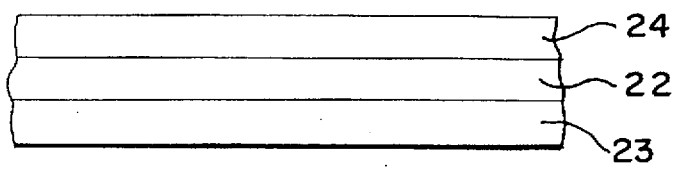
FIG. 2 is schematic cross-sectional view through the protective layer portion of the roof.
Figure 3:
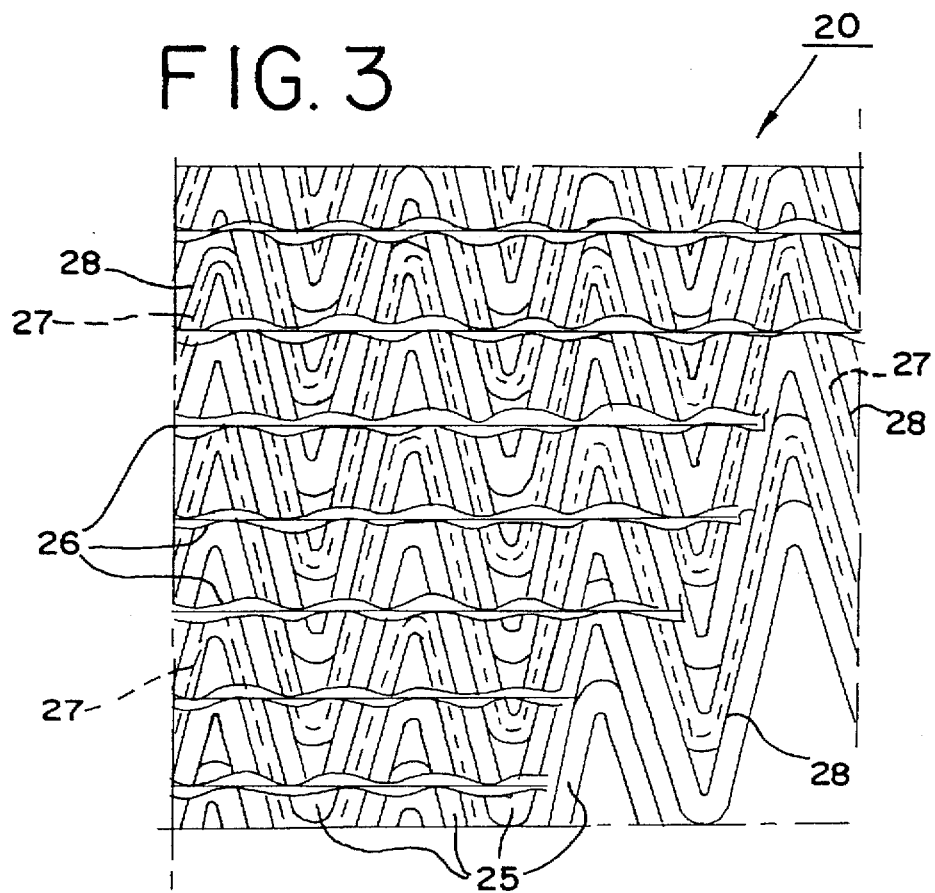
FIG. 3 is a large schematic surface view of a fragment of the cut resistant material layer included in the protective layer of the roof covering.

As compared with woven materials which have heretofore predominantly been proposed for the production of anti-theft or anti-vandalism layers, cut resistant fabrics, like those illustrated in FIG. 2, particularly fabrics produced on Raschel and crochet galloon machines, have considerable advantages, for example, their resistance to cutting and their ability to be worked.

The cut resisting filament material 25 is made cut resistant first by the way its fibers are positioned and secured in that layer and secondly by inclusion therein of cut proof wire, examples of which are described below. As shown in FIG. 2, the fibers of the cut resisting layer are supported to be able to shift, deflect and bend. In one example of the layer 20 shown in FIG. 2, a large quantity of filaments or fibers 25 are positioned one above the other to define a layer, with each filament arranged along an undulating path across the layer 20. Each filament 25 is wrapped by spaced apart warp filaments or cross filaments 26. Each cross filament wraps around each of the filaments 25 that each cross filament 26 intersects along its path across the layer 20. This produces a sturdy form cut resisting layer 20. The individual fibers are all fixed in position in the layer and with respect to each other. But they are secured by the cross filaments which are spaced far enough apart that the filaments 25 have freedom to deflect and bend when pressure is applied to them.

Either some of the filaments 25 of the layer 20 are themselves wires or preferably comprise a wire 27 which is sheathed in a respective, wound, knitted or braided covering 28 of the cut resisting filament material. The wires strengthen the protective layer and are present in or at a sufficient quantity of the filaments 25, either in or at all or preferably in a large proportion of the filaments, sufficient to make the layer 20 cut resistant. Yet, wires that are sheathed do not easily project out of the plane of the cut resisting layer without the respective filaments also projecting out.

In an attempt at cutting a woven fabric using a knife, the cutting instrument preferably acts in a direction perpendicular to the yarn of the protective layer and easily cuts through the fibers. The construction of cut resistant fabric of the invention avoids that. Perpendicular direction motion of application of the cutting instrument will only rarely occur. The component of force of the yarn acting parallel to and in opposition to the force exerted by the cutting instrument is thus clearly less in the case of woven fabrics than in the case of cut resistant fabrics hereof, which provides a particular advantage over woven fabrics. As shown by attempts at cutting, definitely greater resistance to cutting can be obtained with fabrics according to the invention than with woven fabrics or with needled felts, which have also been proposed for use as anti-vandalism layers.

Further clear advantages are shown in the working properties of cut resistant fabrics of the invention as compared with woven fabrics. Thus, upon producing woven fabrics from aramid fibers, considerable losses in strength must be tolerated. In the event of incorrect working, up to 50% of the initial strength can be lost. This impairment of a woven fabric strength upon its manufacture is due, with a high degree of probability, to the squeezing and shearing stresses of the yarns which already take place at the points of intersection of the warp and filling threads. Due to the method of working and the construction of cut resistant fabrics according to this invention, these stresses are considerably reduced. The initial strength of the aramid fibers therefore is substantially better retained upon the manufacture of cut resistant fabrics than upon the manufacture of woven fabrics.

A further advantage of using a cut resistant fabric over a woven fabric or a needled felt is the flexibility of the cut resistant fabric upon its being worked. This advantage is seen in the production of convertible roofs, with their unique customary curves and roundings.

At least one nonwoven textile layer 23 is used to bond the protective layer directly to the bottom fabric layer 16 of the roof material and/or at least one other nonwoven textile layer is used for bonding to the top side of the ceiling inner lining 21 so that the protective layer retains a certain mobility with reference to one or both of the adjacent layers. In this connection, the roof material which is provided with the protective layer and/or the ceiling inner lining in principle retain their textile character and can be worked in a normal manner because no reduction in elasticity or stretchability takes place as a result of the protective layer.

The nonwoven layer is preferably needled to the cut resistant fabric layer which permits relative shifting of these layers, which is beneficial for enabling working of the material and for opening and closing the roof covering. It also enables avoiding an adhesive attachment between the protective layer and the nonwoven layer which would inhibit opening and closing of the roof. The needling of the nonwoven layer 23 into the cut resisting layer 22 connects those layers only through the needled fibers, so that the combination of needled together layers retains some mobility with respect to each other. The nonwoven layer may be bonded by an adhesive directly to the layer on its opposite surface, the ceiling liner. Since this does not also bond the ceiling liner to the cut resisting layer, their relative mobility is retained.

It is also possible to provide an additional nonwoven layer 24 at the opposite surface of the protective layer 22 and for the layer 24 to be needled to the layer 22, like the needled 23 is needled. A second nonwoven textile layer 24 is optional.

Although damage to the roof material and/or the ceiling inner lining by stabbing is still possible, despite the protective layer, an incision into and detachment of the material from the back laminated protective layer is quite difficult so that no gaping textile ends result. Furthermore, tearing open the covering by hand is not possible. Another advantage is that stabbing or other injuries to the surface can be repaired and/or sealed using ordinary commercial textile adhesives.

A material for the roof of convertibles which has been prepared for the working can be produced using a layer of a woven fabric or a foil which is connected, preferably by being bonded, to the nonwoven layer so that this material can be worked directly in a customary manner.

In order to enhance its anti-vandalism effect, or its effect as an anti-theft protection, the nonwoven layer may also comprise cut-proof fibers such as aromatic polyamide fibers, polyethylene fibers spun by the gel-spinning process, or glass fibers.

Aromatic polyamide fibers are particularly well-suited as cut-proof textile fibers for the production of the anti-theft and anti-vandalism layer 20, 22. These fibers are frequently also referred to as aramid fibers. Another essential advantage of aramid fibers is their poor burnability, so that a special finish using flame-retarding agents may not be necessary when using this type of fiber. Furthermore, aromatic polyamide fibers also have very high strengths.

Aside from aromatic polyamide fibers, polyolefin fibers, and particularly polyethylene fibers produced by the gel-spinning process, can be used for the production of the anti-theft and anti-vandalism layer. In contrast to aramid fibers, the polyamide fibers do not have the advantage of only minimal burnability and can thus not be employed where this property is required.

Glass fibers, like aromatic polyamide fibers, have good qualities with respect to their non-burnability. Such fibers can also be used for the production of the anti-theft and anti-vandalism layer of the invention.

Each of aromatic polyamide fibers, polyethylene fibers spun by the gel-spinning process, or glass fibers can be used alone in the anti-theft and anti-vandalism layer, or in mixtures of such fibers or in mixtures with other fibers. When selecting the fibers of the mixture and their mixture ratio, the cut resisting properties and the flammability resistance should not be negatively affected. It is preferable to use a cut-resistant fiber as the only textile component in the anti-theft and anti-vandalism layer. Using only aromatic polyamide fibers as the cut-resistant textile fibers in the anti-theft and anti-vandalism layer is particularly preferred.

The weights per unit lengths of the yarns which are to be used for the manufacture of the anti-theft and anti-vandalism layer of the invention lie in selected ranges between denier 420 and 8500. A range of between denier 1000 and 5000 is preferred, and a range of between denier 1500 and 3500 is particularly preferred. When selecting the weight per unit length of the yarn, a compromise must be made between desired resistance to cutting and comfort and effectiveness in use, especially during opening and closing the roof. Higher weight per unit length provides better resistance to cutting than a lower ratio, but lower weight per unit length is preferred for comfort and effectiveness in use. The filament linear density of these yarns should be less than denier 5. A range of linear density between denier 0.5 and 3 dtex is preferred.

A nonwoven layer 23, 24 is applied on the ceiling liner side and is preferably applied on both sides of the protective layer 22. The outer side of each nonwoven layer can be provided with a continuously active adherent layer of adhesive overlaid with a removable protective foil (not shown) so that the protective layer can be worked separately from a roof layer. This is particularly favorable when the protective layer is to be worked together with the roof layer to form the roof of a convertible. In such a case, the protective layer can first be completely produced. Then, after removal of the protective foil, the protective layer can be bonded to the prefabricated roof material at 16 and/or to the ceiling inner lining 21.

The layer of adhesive can be sprayed onto the nonwoven layer or can be applied in the form of a foil which is adhesive on both sides.

The workability of the protective layer located below a roof material or above a ceiling inner lining is improved if some of the wires contained in at least one thread system protrude from the plane of the cut resistant fabric. The wire in the thread and also the threads are flexible enough that despite the inserted wire, the protective layer has sufficient flexibility, which is particularly important also for good resistance to cutting.

For the production of the anti-theft and anti-vandalism layer of the invention, as shown in FIG. 2, the cut resistant fabric is preferably of the type shown. Alternatively usable materials are a warp knitted material, and particularly preferably a knitted material produced on a Raschel or crochet galloon machine, although woven material is not recommended.

The weight per unit area of this cut resistant material can be between 100 and 2000 g/m$^2$. Below 100 g/m$^2$, there would be insufficient resistance to cutting. A range of between 200 and 1000 g/m$^2$ is preferred, particularly a range of between 200 and 600 g/m$^2$. Experiments have shown that the required resistance to cutting can generally be suitably obtained within a range of 300 to 400 g/m$^2$. However, since the resistance to cutting is also dependent on certain other properties, such as, for instance, the linear density of the yarn, the suitable range of 300 to 400 g/m$^2$ can shift upward or downward depending on the nature of the yarns used. Higher ranges of 500 to 700 g/m$^2$, and particularly of 700 to 1000 g/m², can improve the resistance to cutting further. But, they are not always realizable for economic reasons.

As for the stitch density, i.e., stitch spacing between stitches along a warp filament, like 26 in FIG. 2, values of between 1/cm and 20/cm have proven favorable. A range of 2/cm to 5/cm is preferred for the desired resistance to cutting.

In order to obtain a wire containing thread system which protrudes out of the plane of the knitted fabric, filling guide threads of aromatic polyamide fibers are laid by means of a long bar, between the mesh threads, for instance of yarns of aromatic polyamide fibers, which have been guided by means of a short bar. Further filling lapped threads which contain a wire with a knitted over covering around them are placed over them by means of a figure bar. These wire-containing threads protrude out of the plane of the knitted material.

Another possibility is to operate with two long bars and to provide a wire with a knitted covering around it for the upper lapping produced by a long bar. In addition, another knitted around wire is placed over the knit threads by means of a figuring bar. It is essential in this connection that the wire be contained in the long thread lappings since only in this way can good resistance to cutting be obtained.

Selecting the lapping systems which use a wire which is knitted around depends, in particular, on the intended field of use and the required cut resisting properties.

The wire employed in the anti-theft and anti-vandalism layer can be a solid wire, as wire yarn, or as wire twist. The diameter of this wire should be between 0.1 and 2.0 mm. A range of between 0.2 and 0.6 mm is preferred.

The percentage by weight of the wire in the cut resisting material depends on a number of factors. Thus, a relatively small percentage can be used when two or more of the anti-theft and anti-vandalism layers as in FIG. 2 are used one above the other. On the other hand, a higher percentage is required if, for instance, the cut resistant fabric is not formed solely of cut-resistant fibers but of mixtures of cut-resistant with non-cut-resistant fibers. Therefore, the percentage by weight of the wire in the anti-vandalism layer of the invention can lie within a range of 10 to 90%. A range of 20 to 60% is preferred.

The wire should have either an undulated or a spiral shape. For better workability of the fabric and ultimately of the roof, an undulated shape is preferred. Three essential advantages are obtained from using the undulated shape. The resistance to cutting of an anti-theft and anti-vandalism layer formed with an undulated wire is substantially better than with a smooth or untextured wire. The better resistance to cutting of a material produced with undulated wire can be explained, in particular, by the fact that an undulated wire takes up, as a whole, a larger area than a smooth wire in the anti-theft and anti-vandalism layer. Upon insertion of a knife into the material, and particularly upon an attempt to pull the knife through the material to be cut, there is a greater probability that the knife will strike the undulated wire which will prevent the knife being pulled further for an undulated wire than for a smooth wire. The advantage of the undulated wire is particularly noticeable when the cut resistant fabric is formed of mixtures of cut-resistant and non-cut-resistant fibers.

Another advantage is that there is a smaller danger that an undulated wire will work out of the anti-theft and anti-vandalism layer and cause injuries than with a smooth wire. Due to its shape, there is a smaller probability that the undulated wire will be pushed upward through the upper fabric or downward through the ceiling inner lining and protrude from either one as a result of the mechanical stresses applied upon the opening and closing of the roof than in the case of a smooth, non-undulated wire.

A third advantage of an undulated wire is the greater flexibility of the knitted material produced and thus its better workability.

There are no particular limitations on the shape and the number of undulations. A length ratio of 1:1.5 to 1:3.5 has proven favorable, wherein 1 is the length of the wire in its undulated or spiral condition, and the other number is the length of the wire after it has been stretched and pulled out.

The wire which is to be used in the anti-theft and anti-vandalism layer of the invention is preferably covered by a sheath of textile fibers. Possibilities for applying that sheath include spinning, wrapping, braiding or twisting-in of the wire on itself. These are well-known to those skilled in the art. A wire 27 which is knitted or braided around at 28 is particularly preferred for the production of the anti-theft and anti-vandalism layer of the invention.

For knitting around a wire, the wire is inserted in the knit structure and is surrounded by the additional formation of further stitches forming a knitted fabric as a sheath for the wire. This knitting-around of the wire prevents it from working its way out of the anti-theft and anti-vandalism layer due to the mechanical stressing thereof and prevents injuries in the event of its being possibly cut.

Experiments have shown that, as a result of the special structure of the roof layer produced by knitting-around the wires, substantially greater protection against the wire protruding can be obtained than with other methods of forming a sheath, such as spinning, wrapping or twisting-in.

Yarns of any desired fiber materials can be used for knitting around the wire. To achieve optimal resistance to the anti-theft and anti-vandalism layer being cut, use of a cut-resistant fiber, such as an aromatic polyamide fiber, a polyethylene fiber produced by the gel-spinning process or a glass fiber is preferred with aromatic polyamide fiber being particularly preferred.

The wire 27 used for the anti-theft and anti-vandalism layer may have a sheathing comprised of a readily meltable polymer. All polymers which can be used as thermoplastic adhesives are suitable. Examples of such polymers are ethylene-vinyl acetate copolymers, copolyamides, copolyesters, polyisobutylene, and polyvinylbutyrals.

A wire provided with thermoplastic or hot melt adhesive is preferably introduced into the lapping system, particularly intended for the bonding upon the production of the knitted material. The anti-theft and anti-vandalism layer of the invention can thus contain both wires provided with thermoplastic adhesive and wires which do not have a thermoplastic covering.

The anti-theft and anti-vandalism layer 20 of the invention is used for the roofs of convertibles. The roof material 12 is arranged above the protective layer 20 and/or the ceiling inner lining 21 is arranged below the protective layer. For this, any kinds of known roof material are suitable. There are no restrictions on the nature of the fiber and the construction of the flat textile structure for the roof material or the ceiling inner lining. The roof material and the ceiling inner lining should be provided with a flame-retarding finish or should be made of respective fibers having flame-retarding agents spun to them.

The nature of the attachment of the anti-theft and anti-vandalism layer of the invention in convertible roofs is of considerable importance. Direct full surface bonding of the cut resistant material to the roof material or to the ceiling inner lining 21 is disadvantageous. For obtaining good resistance to cutting, it is important to permit a certain relative movability of the knitted material arranged as an anti-theft and anti-vandalism layer below the roof material and/or on the top of the ceiling inner lining. This provides greater resistance to cutting than an anti-theft and anti-vandalism layer which is bonded rigidly or over its entire surface to the upper material layer. The protective layer 20 bonded to the roof material and/or to the top side of the ceiling inner lining via a nonwoven layer which is needled to the knitted material provides the required mobility of the protective layer.

A layer of thread protruding out of the plane of the cut resistant material provides additional linear bonding of the cut resistant to the nonwoven materials without reducing the required relative mobility between layers and, possibly without great additional expense, for instance by applying an adhesive between the layers by means of a roller. The layer of threads protruding out of the plane of the cut resistant material contains the wire, and the bonding is effected preferably on the wire containing thread system. A better adhesive effect is obtained at the wire containing places than at the places which do not contain wire. Linear bonding, on the other hand, affords the advantage of the possibility of good separability if, for instance, a repair to the convertible roof becomes necessary, for instance, to replace the roof material and/or the ceiling inner lining.

The anti-theft and anti-vandalism layer of the invention provides effective protection against the roof being cut. Furthermore, the anti-theft and anti-vandalism layer of the invention affords a number of other advantages, such as little danger of injury upon the breaking of the wires included in the cut resistant material and good separability particularly of the anti-theft and anti-vandalism protective layer from the neighboring layer for possible repair work, while still retaining a good attachment to the adjoining layers. Furthermore, the use of aromatic polyamide fibers or glass fibers, has the advantage of poor burnability of the anti-theft and anti-vandalism layer.

The anti-theft and anti-vandalism layer can be used to particular advantage in combination with the roof material disclosed in U.S. Pat. No. 5,385,774, which is formed of an upper fabric layer, a bottom fabric material layer, and a rubberized layer arranged between them. There the upper fabric is formed of warp and filling threads consisting of polyacrylonitrile. At least the warp threads of the upper fabric consist of endless threads (multifilaments). The upper fabric has a coating at least on the upper side of the fabric. The rubberized layer between the upper fabric and the bottom fabric is developed in two layers. An intermediate layer of knitted material which is of high strength as compared with the rubberized layers is embedded between the rubberized layers.

These features provide essential advantages. This roof material has great resistance to light and to the ambient elements and the environment. It also has good elasticity and heat retention. The measure of forming the warp threads from endless threads contributes both to improving the strength and to reducing the elongation of the roof material.

The coating applied on the upper fabric layer 14 can consist of a transparent plastic material. Alternately, a coating material having a base of fluorine-containing polymers, such as TFB (tetrafluorbutylene) dispersions may be used. This advantageously provides a particular improvement in quality for the roof material, with respect to weather resistance, less adherence of dirt, and better possibility of care, particularly including resistance to jets of vehicle washing liquid. Another important advantage is increased resistance to ultraviolet rays from which results in a longer life. Other advantages are good sliding properties, anti-adhesiveness, water-repellency, and high resistance to chemicals.

The particular advantages of the intermediate layer 18 are that the roof material is imparted high strength with low stretchability. Furthermore, ballooning, which is frequently observed in the case of convertible roofs, (caused by the difference in pressure between the outside and inside of the vehicle traveling at high speed) is counteracted.

These advantages can be further optimized if, in accordance with a further development of the invention, the intermediate layer comprised mostly fibers or threads of high-strength material (tetrafluorobutylene), aramid being particularly in mind. The fibers or threads, however, may also comprise carbon, glass, steel or highly stretched polyethylene.

Preferably the intermediate layer comprises a lattice fabric which is formed of fibers or threads of material which is of high strength, as compared with the rubberized layers, and preferably of aramid threads. In a further feature, the warp of filling threads of the lattice fabric extend at an angle of between 30° and 60°, and preferably 45°, to the longitudinal axis of the fabric. In this way, the roof material is isotropic, i.e. equally stretchable in the longitudinal, transverse, and diagonal directions. Cutting of the roof material is thus made additionally difficult. Furthermore, fatigue of the roof material is counteracted.

A further feature is that the bottom layer of material 16 comprises a woven or knitted fabric formed at least predominantly of synthetic fibers or threads. This provides the advantage of relatively high resistance to abrasion. This is of great importance particularly in the case of convertible roofs which are automatically extended and retracted, since this provides enormous stressing and wear. This type of bottom material also presents the possibility of adapting the color of the roof material to the inner decor of the vehicle.

Fibers, threads, wires or strips of foil of electrically conductive material incorporated in the upper fabric, in the intermediate layer, or in the bottom material, as well as in the anti-theft and anti-vandalism layer, assure that an automobile with a convertible roof can also act as a "Faraday cage". Furthermore, this enables connecting the roof with an alarm system, thus affording increased protection against theft.

The upper fabric layer 14 is preferably impregnated (dip coated), in particular with TB(tetrafluoro)-dispersions which are obtainable on the market, for instance, under the trade name "Hostaflon".

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A folding roof for vehicles comprising:
   an upper fabric layer toward an outside of the roof;
   a lower fabric layer below the upper fabric layer;
   a rubberizing layer between the upper fabric layer and the lower fabric layer;
   a protective layer disposed on a side of the lower fabric layer away from the rubberizing layer, the protective layer comprising:

a cut resisting layer of knitted material including cut resisting fibers selected from a group consisting of aromatic polyamide fibers, polyethylene fibers spun by the gelspin process, or glass fibers, and further including sheathed wires having a diameter of 0.1 to 2 mm disposed among at least some of the fibers in the cut resisting layer, wherein some of the sheathed wires protrude from a plane of the cut resisting layer, and a layer of textile nonwoven material applied by needling to at least one side of the cut resisting layer; and by linear bonding to the sheathed wires protruding from the plane of the cut resisting layer, the layer of nonwoven material being connected by bonding to the lower fabric layer.

2. The invention of claim 1, wherein the layer of nonwoven material is comprised of cut resistant fibers.

3. The invention of claim 1, further comprising an adhesive layer on the layer of nonwoven material and a removable protective foil over the adhesive layer.

4. The invention of claim 1, further comprising a respective one of the layers of nonwoven material applied on both sides of the protective layer.

5. The invention of claim 1, wherein the layer formed of cut resistant fibers is warp knitted material.

6. The invention of claim 1, wherein the wire contained in the thread system in an undulated or spiral shaped wire.

7. The invention of claim 1, wherein the wire in the thread system is knitted around by a knitted material of textile yarn.

8. The invention of claim 7, wherein the wire in the cut resistant material is sheathed by a polymer of low melting point.

9. A folding roof for vehicles comprising:

a roof layer, including an outer side facing out of the vehicle roof, and an opposite side;

a ceiling inner lining located below the opposite side of the roof layer, the ceiling inner lining having a top side toward the roof layer;

a protective layer arranged at the top side of the ceiling inner lining, the protective layer comprising:

a cut resisting layer of knitted material including cut resisting fibers selected from the group consisting of aromatic polyamide fibers, polyethylene fibers spun by the gelspin process, or glass fibers, and further including sheathed wires having a diameter of 0.1 to 2 mm disposed among at least some of the fibers in the cut resisting layer, wherein some of the sheathed wires protrude from a plane of the cut resisting layer, and a layer of textile nonwoven material applied by needling to at least one side of the cut resisting layer and by linear bonding to the sheathed wires protruding from the plane of the cut resisting layer, the layer of nonwoven material being connected by bonding to the top side of the ceiling inner lining.

10. The invention of claim 9, wherein the roof layer comprises:

an upper fabric layer toward the outside of the roof;

a lower layer below the upper fabric layer;

a rubberizing layer between the upper fabric layer and the lower fabric layer; and the protective layer being additionally arranged on the lower layer of the roof layer.

11. The invention of claim 9, wherein the nonwoven layer is comprised of cut proof fibers.

12. The invention of claim 9, further comprising an adhesive layer on the nonwoven layer and a removable protective foil over the adhesive layer.

13. The invention of claim 9, further comprising a respective one of the nonwoven layers applied on both sides of the protective layer.

14. The invention of claim 13, further comprising an adhesive layer and a removable protective foil over the adhesive layer provided on at least one of the nonwoven layers.

15. The invention of claim 9, wherein the layer formed of cut resistant fibers is warp knitted material.

16. The invention of claim 9, wherein the wire contained in the thread system in an undulated or spiral shaped wire.

17. The invention of claim 9, wherein the wire in the thread system is knitted around by a knitted material of textile yarn.

18. The invention of claim 17, wherein the wire in the cut resistant material is sheathed by a polymer of low melting point.

19. The invention of claim 10, wherein the upper fabric layer is comprised of warp and filling threads formed of polyacrylonitrile, and at least the warp threads of the upper fabric layer are comprised of endless threads;

the upper fabric layer having an outer side;

a coating on at least the outer side of the upper fabric layer;

the rubberizing layer between the upper and lower fabric layers is in the form of two layers; and an intermediate layer of a high strength material, as compared with the rubberizing layers, is being embedded between the two layers of the rubberizing layer.

20. The invention of claim 19, wherein the upper fabric layer is coated with a transparent material at least on the outer side thereof.

21. The invention of claim 20, wherein the coating on the upper fabric layer is comprised of a coating agent having a base of fluorine containing polymers.

22. The invention of claim 19, Wherein the intermediate layer between the two rubberizing layers is comprised of fibers of a material of high strength as compared with the strength of the two rubberizing layers.

23. The invention of claim 22, wherein the fibers of the intermediate layer are selected from the group consisting of aramid, carbon, glass, steel and highly stretched polyethylene.

24. The invention of claim 22, wherein the intermediate layer comprises a lattice fabric formed of the fibers of a material of high strength.

25. The invention of claim 24, wherein the warp or filling threads of the lattice fabric extend at an angle of between 30° and 60° to the longitudinal axis of the lattice fabric.

26. The invention of claim 19, wherein the material of the lower fabric layer is comprised of a woven or knitted fabric formed at least predominantly of synthetic material fibers or threads.

27. The invention of claim 19, further comprising at least one of threads, wires or foil strips of electrically conductive material incorporated in at least one of the upper fabric layer, the lower fabric layer or the intermediate layer in the rubberizing layer.

28. The invention of claim 19, wherein the upper fabric layer is an impregnated layer.

* * * * *